Figure 1:
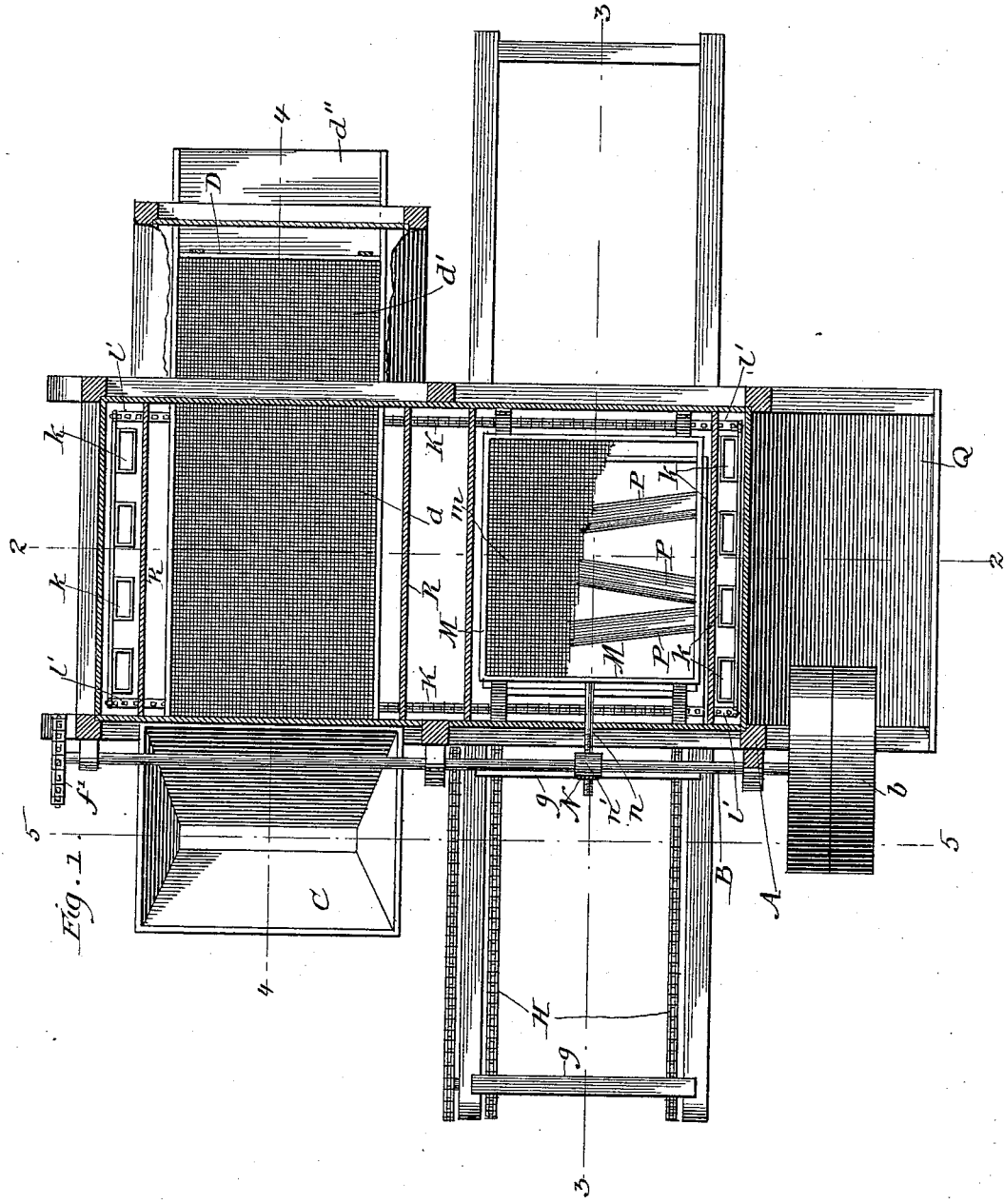

(No Model.) 5 Sheets—Sheet 1.
N. A. CLACHER.
SEPARATING AND FILLING MACHINE FOR CONFECTIONERS' USE.

No. 449,668. Patented Apr. 7, 1891.

Witnesses:
Harry T. Jones.
John L. Jackson.

Inventor
Neil A. Clacher

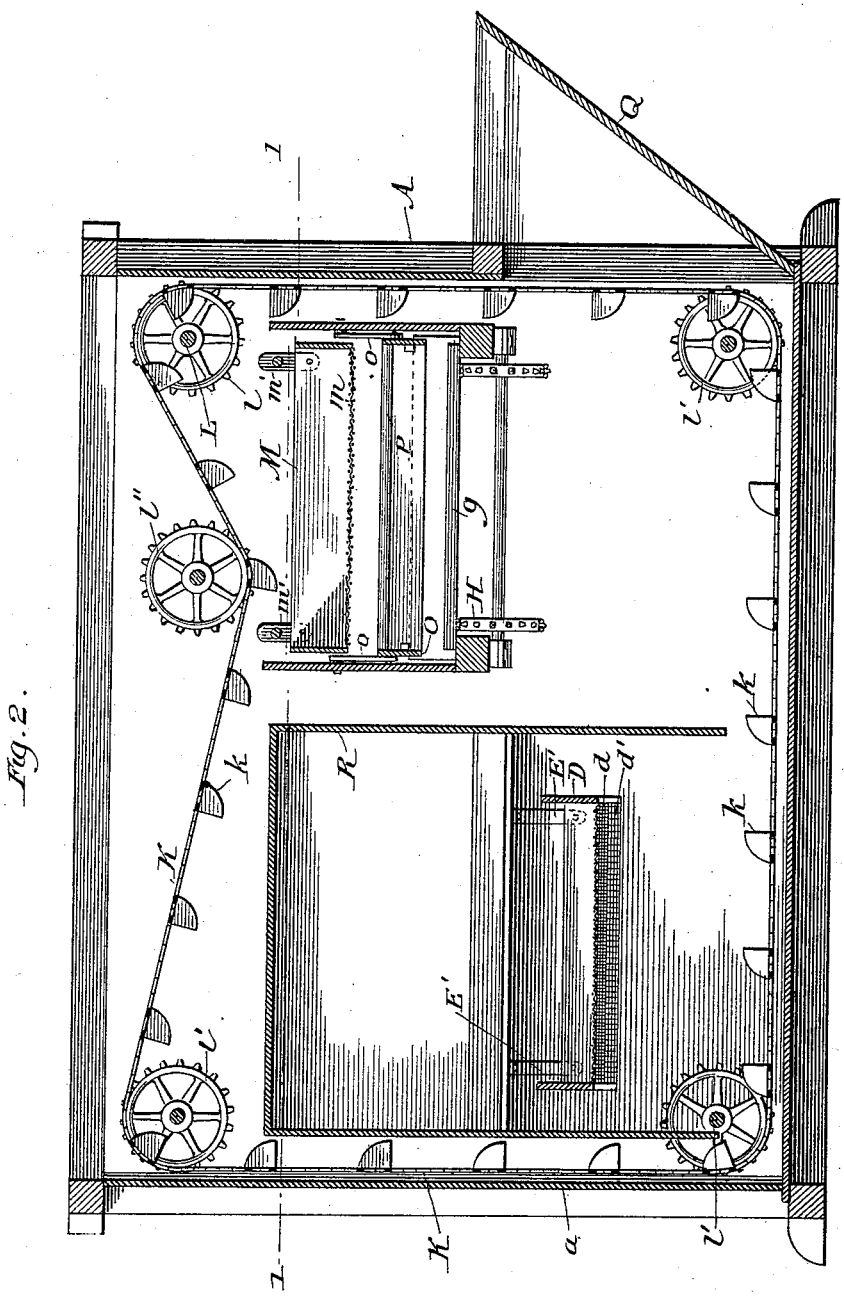

(No Model.) 5 Sheets—Sheet 3.
N. A. CLACHER.
SEPARATING AND FILLING MACHINE FOR CONFECTIONERS' USE.
No. 449,668. Patented Apr. 7, 1891.
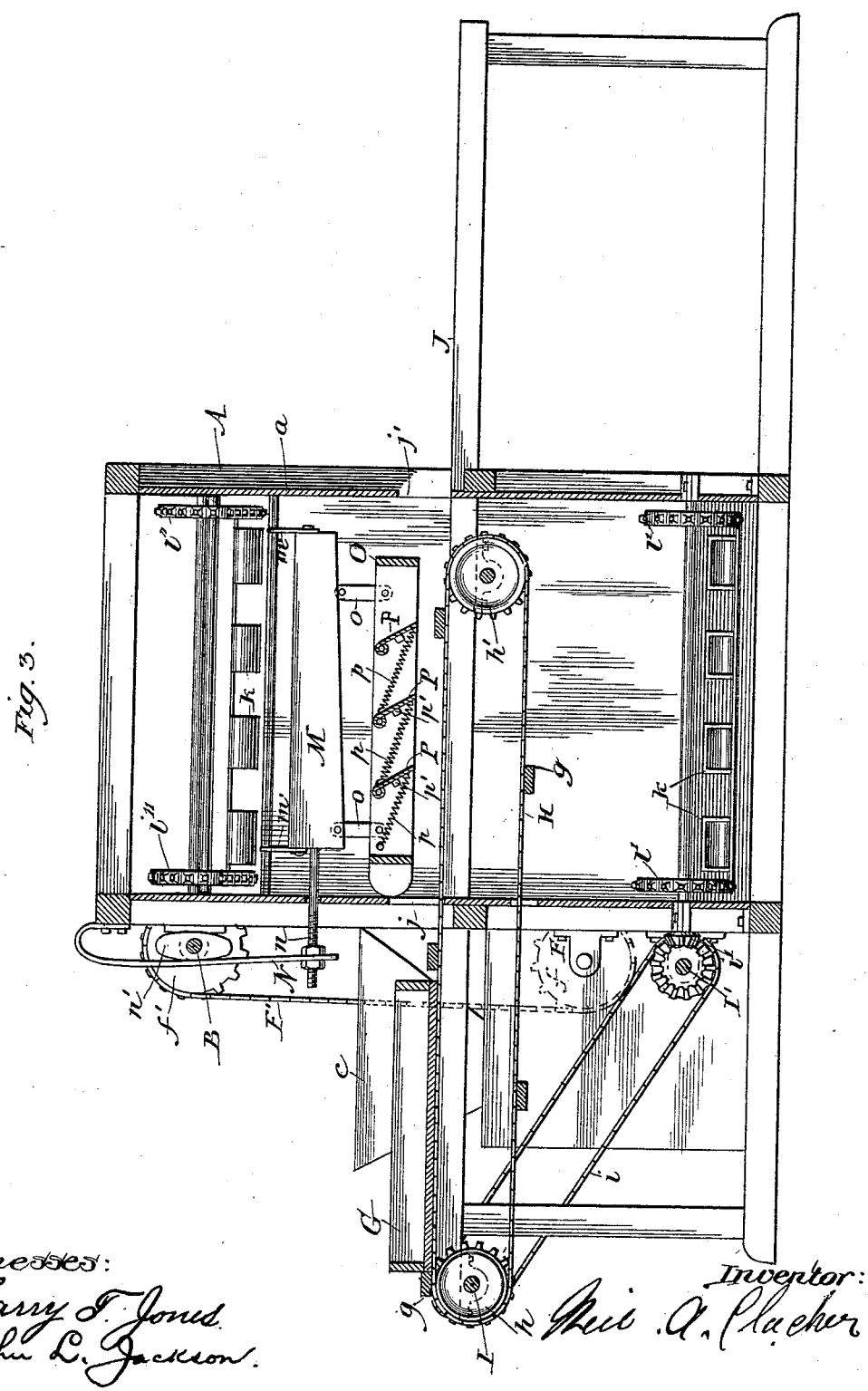

(No Model.) 5 Sheets—Sheet 4.
N. A. CLACHER.
SEPARATING AND FILLING MACHINE FOR CONFECTIONERS' USE.
No. 449,668. Patented Apr. 7, 1891.
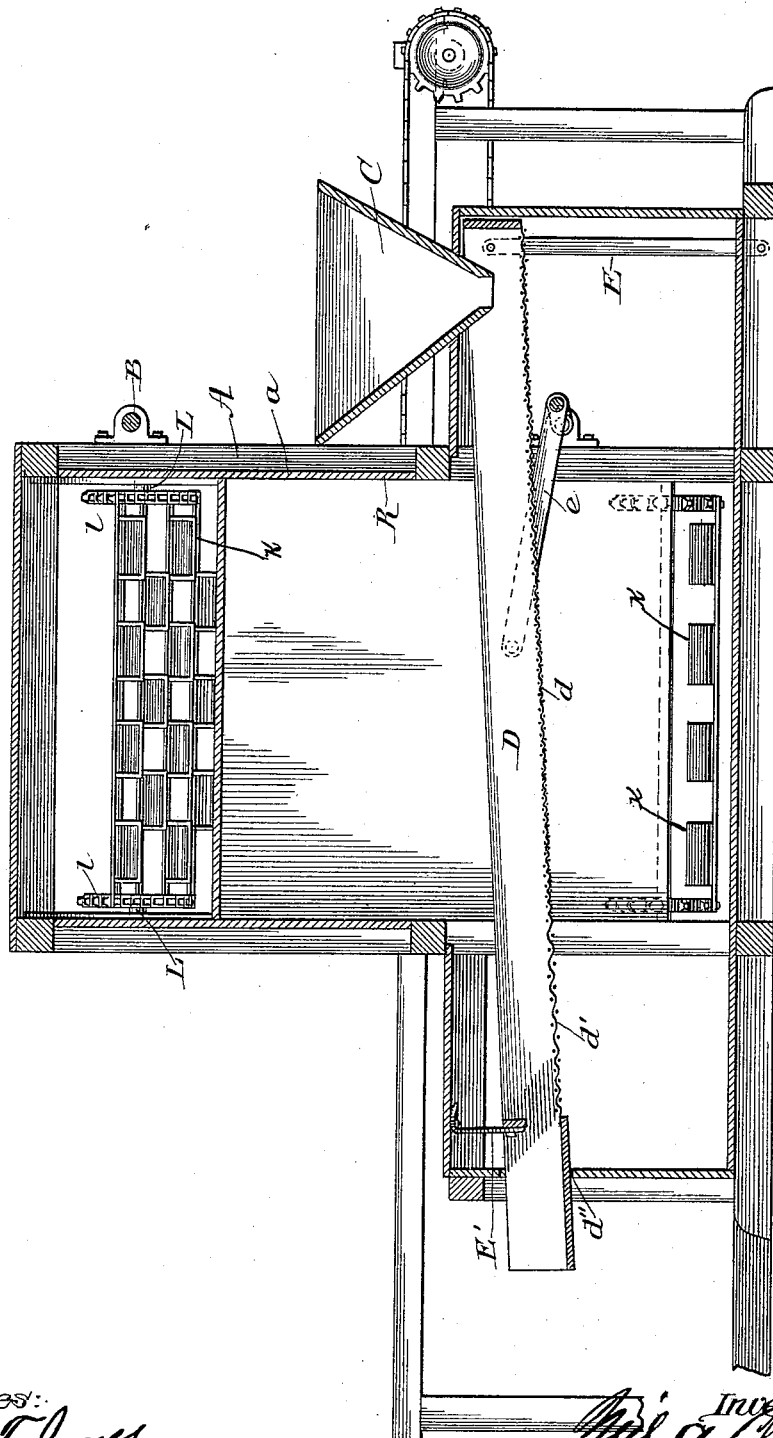

(No Model.)
5 Sheets—Sheet 5.
N. A. CLACHER.
SEPARATING AND FILLING MACHINE FOR CONFECTIONERS' USE.
No. 449,668.
Patented Apr. 7, 1891.
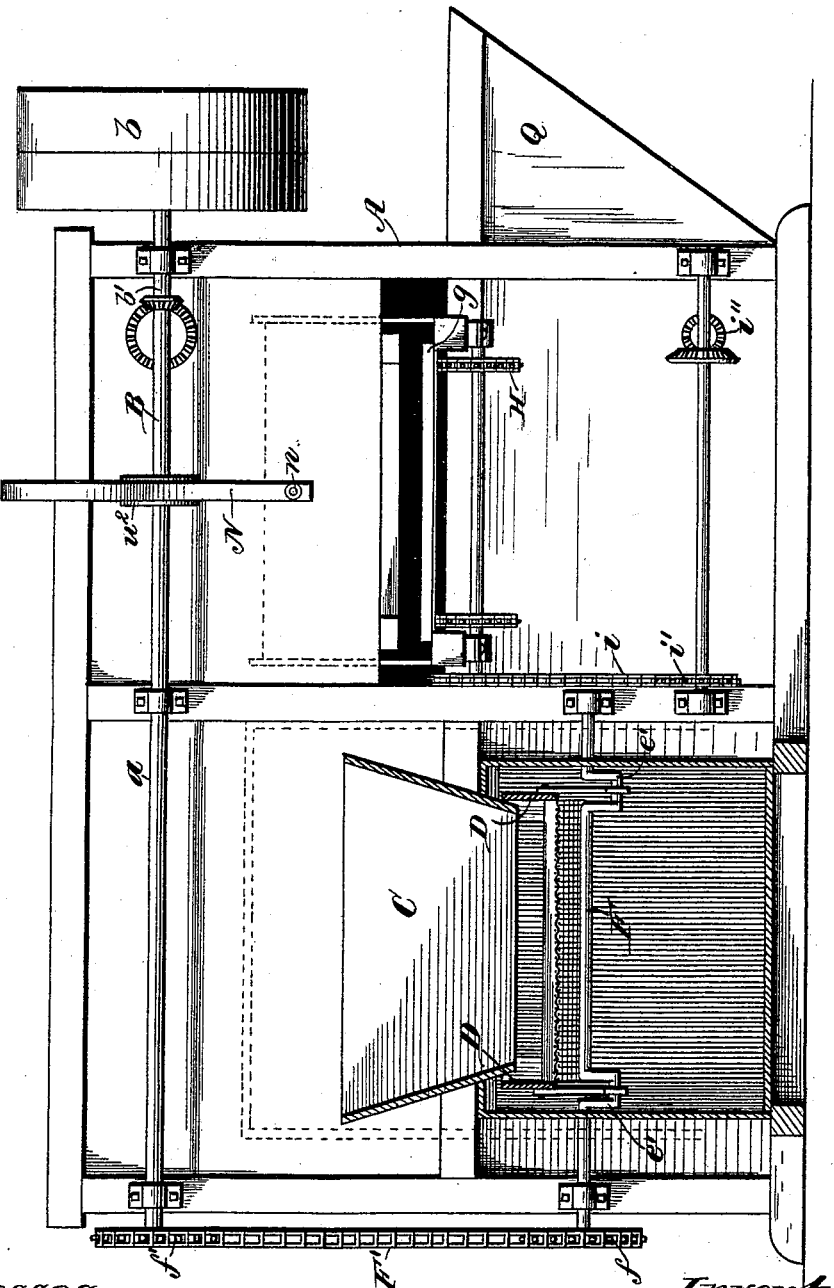

UNITED STATES PATENT OFFICE.

NEIL A. CLACHER, OF CHICAGO, ILLINOIS.

SEPARATING AND FILLING MACHINE FOR CONFECTIONERS' USE.

SPECIFICATION forming part of Letters Patent No. 449,668, dated April 7, 1891.

Application filed June 2, 1890. Serial No. 354,072. (No model.)

*To all whom it may concern:*

Be it known that I, NEIL A. CLACHER, residing in Chicago, county of Cook, and State of Illinois, and a citizen of the United States, have invented a new, useful, and Improved Separating and Filling Machine for Confectioners' Use, of which the following is a specification, reference being had to the accompanying drawings, in which—

Figure 1 is a plan view, the case being sectioned at line 1 1 of Fig. 2. Fig. 2 is a cross vertical section at line 2 2 of Fig. 1. Fig. 3 is a longitudinal vertical section at line 3 3 of Fig. 1. Fig. 4 is a longitudinal vertical section at line 4 4 of Fig. 1; and Fig. 5 is an end elevation, some parts being sectioned, at line 5 5 of Fig. 1.

It is the common practice of confectioners to mold such candies as gum-candies and cream-candies, &c., in mold boxes or boards commonly called "starch-boards." The boards are low boxes, and are filled to the required depth with starch, and the mold is formed in the starch by printing with a suitable pattern, a large number of small molds being formed in the starch on a single board. After the molded candy is dried sufficiently to be handled the candy must be separated from the starch. This has heretofore been done by sifting, the sieve being held and shaken by hand, and the starch-boards have been again filled from the starch sifted from the candy.

The object of this invention is to provide an improved machine which will separate the starch from the candy and will fill starch-boards in readiness to be printed for second molding of candy. I accomplish this object as illustrated in the drawings, and as hereinafter described.

That which I claim as new will be set forth in the claims.

In the drawings, A represents the framework, which is made in suitable form to support and contain the operating parts hereinafter set forth. The machine is inclosed by suitable panels $a$, which are removably secured to the frame-work A.

B is the main driving-shaft, which is driven by means of a pulley $b$, as best shown in Fig. 5.

C is a hopper, into which the contents of a starch-board are poured.

D is a sieve-frame, one end of which is located beneath the hopper C, as best shown in Fig. 4. The sieve $d$ at the middle and at the end near the hopper C is a sieve of the proper fineness to permit the passage of the starch used in molding, while the sieve $d'$ at the outer end of the frame D is somewhat coarser, for purposes hereinafter set forth.

The sieve-frame D is supported upon pivoted standards E at one end and by straps E' at the opposite end, as best shown in Fig. 4. This sieve-frame D is shaken by means of two pitmen $e$, which are driven by means of cranks $e'$ in a shaft F. This shaft F is provided with a sprocket-wheel $f$, which is driven by a sprocket-chain F', that is driven by a sprocket-wheel $f'$ on the main shaft B, as best shown in Figs. 3 and 5.

The candies and starch poured into the hopper C will be delivered upon the sieve $d$, and the rapid shaking of the sieve $d$ will cause the starch to sift through the sieve and fall to the bottom of the case of the machine. The frame D is inclined sufficiently to cause the candy to work downward thereon and be delivered therefrom at the opposite end from the hopper C. The small lumps of starch and particles of candy which are too coarse to pass through the sieve $d$ will pass through the sieve $d'$, so that the candy will be delivered from the sieve $d'$ perfectly clean. A board or extension $d''$ is provided, over which the candy is delivered to a suitable receptacle.

The starch-board G, after its contents have been emptied into the hopper C is to be refilled for second molding. The operator places the starch-board G upon an endless belt H, which consists of drive-chains provided with cross-cleats $g$, as shown in Figs. 1 and 3. This endless belt H runs over sprocket wheels or pulleys $h$, secured on a shaft I at one end, and over a sprocket-wheel $h'$, mounted on a shaft secured in suitable bearings at the inner end. The shaft I is driven by a drive-chain, which is driven by a sprocket-wheel $i'$ on a shaft I', which shaft receives motion from a shaft driven by the conveyer-belts, as hereinafter set forth.

The starch-board G is placed upon the endless belt H at one end, as shown in Fig. 3, and is carried by said belt to an opening $j$ into the case of the machine and out through an opening $j'$ at the opposite side of the machine and delivered onto a table J, from which it is removed by an attendant.

The starch-boards G are filled with starch sifted from the candy through the sieve $d$ by mechanism which I will now describe.

K represents an endless conveyer-belt, which is provided with a number of buckets $k$, as best shown in Fig. 2. This conveyer-belt K passes over sprocket-wheels $l$, which are secured upon the shaft L. This shaft L is driven from the main driving-shaft B by means of beveled gear $b'$. (See Fig. 5.) The belt K passes around sprocket-wheels $l'$, arranged in convenient parts of the frame B, as best shown in Fig. 2. The belt K passes under an idler-wheel $l''$ to insure the emptying of the buckets. The sprocket-wheel $l'$ at the lower right-hand corner of Fig. 3 is secured upon its shaft, and the shaft I' is driven from this shaft by means of bevel-gear $i''$, as shown in Fig. 5. The buckets $k$ are arranged upon rods carried by drive-chains, as best shown in Fig. 4, alternate rods carrying four buckets and three buckets, so that the entire width between the chains is covered. The buckets $k$ pass beneath the sieve $d$ at the bottom of the case, as shown in Fig. 2, where they are filled. They pass to the side of the case, thence upwardly to the top of the case and over the pulleys $l$. After passing the pulleys $l$ they deliver their contents onto a sieve $m$, which is secured to a frame M. The frame M is located above the carrying-belt H, as best shown in Fig. 2. The sieve-frame is supported by ears $m'$, which slide upon rods secured in said frame. The frame M is shaken by means of a rod $n$, which passes through the framework and is connected to one end of a spring N, as best shown in Fig. 3. This spring N is engaged by a cam $n'$ on the shaft B. The rotation of the shaft B through the cam $n'$ and spring N will draw the rod $n$ outward and the spring will force it backward.

O represents a frame, which is supported above the endless belt H and below the sieve M, as shown in Fig. 3. This frame is supported upon pivoted hangers $o$, which are attached to the case of the machine. This frame is provided with a number of levelers P, which are arranged crosswise at varying angles, as shown in Fig. 1. Each leveler P is hinged at its upper edge to the frame O, and is provided with a spring $p$, attached to its lower edge, which draws its lower edge downward. A suitable stop $p'$ is provided for each leveler for preventing the spring $p$ from drawing the leveler back out of operative position. The frame O normally occupies the position shown in Fig. 3. When a starch-board G is carried within the case of the machine by the endless belt H, the sides of the frame O will rest upon the sides of the starch-board G. The frame O is supported upon parallel pivoted hangers $o$, so that the frame O can be raised by the starch-board G. The starch delivered from the buckets $k$ will fall upon the sieve $m$ and be sifted onto the starch board G when it passes beneath said sieve $m$. The height of the sides of the starch-boards G now in use vary, and the swinging frame O will rest upon the sides of the starch-board, bringing the levelers P on a level with the upper edges of the sides. The levelers P are arranged at different angles across the frame O, so as to properly level the starch on the starch-boards. The sprocket-wheel $h'$ is within the case of the machine, so that no starch will be carried out of the machine by the endless belt. All starch which does not fall onto the starch-board G from the sieve $m$, and all starch scraped from the board by the levelers P will fall to the bottom of the case, where it may be taken up by the buckets $k$.

Q is an opening in the side of the case, through which additional starch may be supplied by the operator, and from which a surplus of starch may be taken, if necessary.

R represents a case arranged over and around the sieve-frame D to prevent starch from being thrown onto the candy in the sieve by the buckets $k$.

The candy and starch are poured from the mold-boards G into the hopper C, and descend from the hopper C onto the sieve $d$. The sieve $d$ separates the fine starch from the candy, and the sieve $d'$ separates the small pieces of candy and lumps of starch from the candy, and the candy is delivered to a proper receptacle over the board $d''$. The lumps and small pieces of candy which pass through the sieve $d'$ may be taken out at any time. The starch which passes through the sieve $d$ is carried upward by the buckets $k$ and delivered to the sieve $m$. The operator places the starch-board, after its contents have been emptied into the hopper C, on the belt H. Said belt H carries the starch-board beneath the sieve $m$, from which it is filled with starch. The levelers P and the swinging frame O level off the starch on the starch-board. The sieve $m$ sifts the starch and prevents it being delivered to the boards in lumps, as might otherwise be the case. The filled starch-boards are delivered onto the table J, from which they can be removed by the attendant.

I do not limit my invention to the arrangement and form of driving mechanism shown, as this may be varied greatly.

The starch is sifted onto the starch-boards G and is perfectly loose thereon, so as to form a perfect mold for the second molding of candy.

What I claim as new, and desire to secure by Letters Patent, is—

1. The combination, with a charging-receptacle having an outlet to permit the flow of molding material therefrom, of a feeding device for conducting empty trays thereto to receive their charge of molding material.

2. The combination, with a charging-receptacle having an outflow-opening, of a feed device adapted to direct the empty trays under said outflow to receive their charge, and a striker for leveling the charge in the trays.

3. The combination, in a machine for separating candy from starch, of a hopper, a vibrating sieve, a receptacle for the starch, and a receptacle for the separated candy, with a conveyer-belt provided with buckets, substantially as specified.

4. The combination, with a sieve for separating starch from candy, of a conveyer-belt for carrying starch-boards, and a conveyer-belt K for filling the starch-boards with the separated starch, substantially as specified.

5. The combination, with an endless belt for carrying starch-boards, of a conveyer-belt K for carrying starch, and a sieve M, substantially as specified.

6. The combination, with an endless belt for carrying a starch-board, of a conveyer-belt K, swinging frame O, and levelers P, substantially as specified.

7. The combination, with a sieve for separating starch from candy, a conveyer-belt K, sieve M, swinging frame O, and levelers P, of an endless belt for carrying such starch-board, substantially as specified.

NEIL A. CLACHER.

Witnesses:
HARRY T. JONES,
JOHN L. JACKSON.